United States Patent
Li et al.

(10) Patent No.: US 12,317,368 B2
(45) Date of Patent: May 27, 2025

(54) EMERGENCY CALL METHOD AND APPARATUS, STORAGE MEDIUM, AND TERMINAL

(71) Applicant: YULONG COMPUTER TELECOMMUNICATION SCIENTIFIC (SHENZHEN) CO., LTD., Shenzhen (CN)

(72) Inventors: Liu Li, Shenzhen (CN); Bin Cheng, Shenzhen (CN)

(73) Assignee: YULONG COMPUTER TELECOMMUNICATION SCIENTIFIC (SHENZHEN) CO., LTD., Shenzhen (CN)

( * ) Notice: Subject to any disclaimer, the term of this patent is extended or adjusted under 35 U.S.C. 154(b) by 246 days.

(21) Appl. No.: 18/020,384

(22) PCT Filed: Dec. 4, 2020

(86) PCT No.: PCT/CN2020/134091
§ 371 (c)(1),
(2) Date: Feb. 8, 2023

(87) PCT Pub. No.: WO2022/116211
PCT Pub. Date: Jun. 9, 2022

(65) Prior Publication Data
US 2023/0309191 A1 Sep. 28, 2023

(51) Int. Cl.
*H04W 76/50* (2018.01)
*H04L 65/1016* (2022.01)

(52) U.S. Cl.
CPC ......... *H04W 76/50* (2018.02); *H04L 65/1016* (2013.01)

(58) Field of Classification Search
CPC .............................. H04W 76/50; H04L 65/1016
(Continued)

(56) References Cited

U.S. PATENT DOCUMENTS

2015/0281929 A1* 10/2015 Shih ................. H04W 76/50
455/552.1
2021/0112394 A1* 4/2021 Bakker ................. H04W 4/90

FOREIGN PATENT DOCUMENTS

CN 101031135 A 9/2007
CN 101730035 A 6/2010
(Continued)

OTHER PUBLICATIONS

Translated International Search Report and Written Opinion of PCT/CN2020/134091, mailing date of Search Report Aug. 26, 2021. pp. 1-5.

(Continued)

*Primary Examiner* — Maria El-Zoobi
(74) *Attorney, Agent, or Firm* — BOND, SCHOENECK & KING, PLLC; George R. McGuire

(57) ABSTRACT

Provided are an emergency call method and apparatus, a storage medium, and a terminal, related to the technical field of communications. Firstly, it is determined whether the current network device supports an emergency call established on an IMS domain; then, if the current network device supports the emergency call established on the IMS domain, the emergency call is established on the IMS domain. Finally, if the emergency call established on the IMS domain fails, the emergency call is established on the CS domain. If the current network device supports the emergency call established on the IMS domain, it represents that the current network allows the emergency call established on the IMS domain, so the emergency call can be prioritized to be established on the IMS domain, and when the emergency call established on the IMS domain fails, the emergency call may also be established on the CS domain.

17 Claims, 4 Drawing Sheets

(58) Field of Classification Search
USPC .................................................... 455/404.1
See application file for complete search history.

(56) References Cited

FOREIGN PATENT DOCUMENTS

| | | | |
|---|---|---|---|
| CN | 101990184 | A | 3/2011 |
| CN | 107079047 | A | 8/2017 |
| CN | 108696854 | A | 10/2018 |
| CN | 111277990 | A | 6/2020 |
| WO | WO2010120689 | A2 | 10/2010 |
| WO | 2016081098 | A1 | 5/2016 |

OTHER PUBLICATIONS

Translated Chinese First Office Action, App. No. 202080106533.1, dated Apr. 10, 2024, pp. 1-21.
Translated Chinese Office Action, App. No. 202080106533.1, dated Oct. 30, 2024, Entire document.

* cited by examiner

EMERGENCY CALL METHOD AND APPARATUS, STORAGE MEDIUM, AND TERMINAL

CROSS-REFERENCE TO RELATED APPLICATIONS

This is a National Stage Application, filed under 35 U.S.C. 371, of International Patent Application No. PCT/CN2020/134091, filed on Dec. 4, 2020, the disclosure of which is incorporated herein by reference in its entirety.

TECHNICAL FIELD

The present disclosure relates to the technical field of communications, specifically, an emergency call method and apparatus, a storage medium, and a terminal.

BACKGROUND

With the development of science and technology, more and more terminals are used, through network devices, users can implement operations such as calling and data online, on the other hand, the environment where the terminals are located is becoming more and more complex, so the method for achieving an emergency call by a terminal has also become one of the research focuses of technical personnel in the art.

In the related art, when the user identification card in the terminal has a problem, the terminal will be in a limited service state, at this time, the terminal cannot establish a data channel with a network device in a normal manner to make a phone call, generally, an emergency call established on the use of an Internet protocol (IP) multimedia subsystem (IMS) domain is supported, but the terminal cannot achieve an emergency call after the emergency call fails to be established on the IMS domain, which brings a safety hazard to the user security.

SUMMARY

The present application provides an emergency call method and apparatus, a storage medium, and a terminal, to avoid the safety hazard brought to the user security, when the terminal cannot realize the emergency call after the emergency call established on the IMS domain fails in the related art.

An embodiment of the present application provides an emergency call method, and the method includes the following steps.

It is determined whether the current network device supports an emergency call established on an IMS domain;

if the current network device supports the emergency call established on the IMS domain, the emergency call is established on the IMS domain; and if the emergency call established on the IS domain fails, the emergency call is established on a circuit switched (CS) domain.

Alternatively, before it is determined whether the current network device supports the emergency call established on the IMS domain, the method further includes that it is determined whether the terminal is in a limited service state, if the terminal is in the limited service state, the step in which it is determined whether the current network device supports the emergency call established on the IS domain includes that system information broadcast by the current network device is received, and if the system information carries a first emergency call identifier, it is determined that the current network device supports the emergency call established on the IMS domain.

In an embodiment, the step in which the emergency call is established on the IMS domain includes that an attachment request of an emergency call type is sent to the network device, where the attachment request is configured to instruct the network device to establish an attachment data channel on the IMS domain, and an emergency call service is carried on the attachment data channel.

Alternatively, after it is determined that the current device is in the limited service state, the method further includes that if the current device is not in the limited service state, the step in which it is determined whether the current network device supports the emergency call established on the IS domain includes that system information broadcast by the current network device is received, and if the system information carries a second emergency call identifier, it is determined that the current network device supports the emergency call established on the IMS domain.

In an embodiment, the step in which the emergency call is established on the IS domain includes that a public data network request of an emergency call type is sent, where the public data network request is configured to instruct the network device to establish a public data network data channel on the IMS domain, and an emergency call service is carried on the public data network data channel.

In an embodiment, if the system information does not carry the first emergency call identifier or the second emergency call identifier, it is determined that the current network device does not support the emergency call established on the IMS domain, and the emergency call is established on the CS domain.

In an embodiment, the attachment data channel or the public data network data channel is only configured to carry the emergency call service.

An embodiment of the present application provides an emergency call apparatus, and the apparatus includes a network determination module, an IMS domain module, and a CS domain module.

The network determination module is configured to determine whether the current network device supports an emergency call established on an IMS domain.

The IMS domain module is configured to establish the emergency call on the IMS domain, if the current network device supports the emergency call established on the IMS domain.

The CS domain module is configured to establish the emergency call on a CS domain, if the emergency call established on the IMS domain fails.

An embodiment of the present application provides a computer storage medium, the computer storage medium includes multiple instructions, and the multiple instructions are suitable for being loaded by a processor to implement the steps of the preceding method.

An embodiment of the present application provides a terminal, the terminal includes a memory, a processor, and a computer program stored on the memory and operated on the processor, and when the processor executes the program, the steps of the preceding method are implemented.

Embodiments of the present application provide the technical scheme to bring at least the following beneficial effects:

the present application provides an emergency call method, firstly, it is determined whether the current network device supports an emergency call established on an IMS domain; then, if the current network device supports the emergency call established on the IMS domain, the emergency call is established on the IMS domain. Finally, if the emergency call established on the IMS domain fails, the emergency call is established on the CS domain. If the current network device supports the emergency call established on the IMS domain, it represents that the current network allows the emergency call to be established on the IMS domain, so the emergency call established on the IMS domain can be prioritized, and when the emergency call established on the IMS domain fails, the emergency call may also be established on the CS domain, which improves the success rate of establishing the emergency call by the terminal, so that the safety when a user uses the terminal in the emergency state is guaranteed.

DETAILED DESCRIPTION

In order to make the features and advantages of the present application more obvious and easy to understand, the following will be combined with the accompanying drawings in the embodiments of the present application, the technical solution in the embodiment of the present application is clearly and completely described, apparently, the described embodiment is only a part of the embodiment of the present application, not all embodiments. Based on the embodiments of the present application, all other embodiments obtained by those skilled in the art without creative work fall within the scope of protection of the present application.

When the following description relates to the drawings, the same number in different drawings represents the same or similar feature, unless otherwise indicated. The embodiments described in the following implementations do not represent all embodiments consistent with the present application. Rather, they are only examples of apparatuses and methods consistent with some aspects of the present application as detailed in the attached claims.

Figure 1:
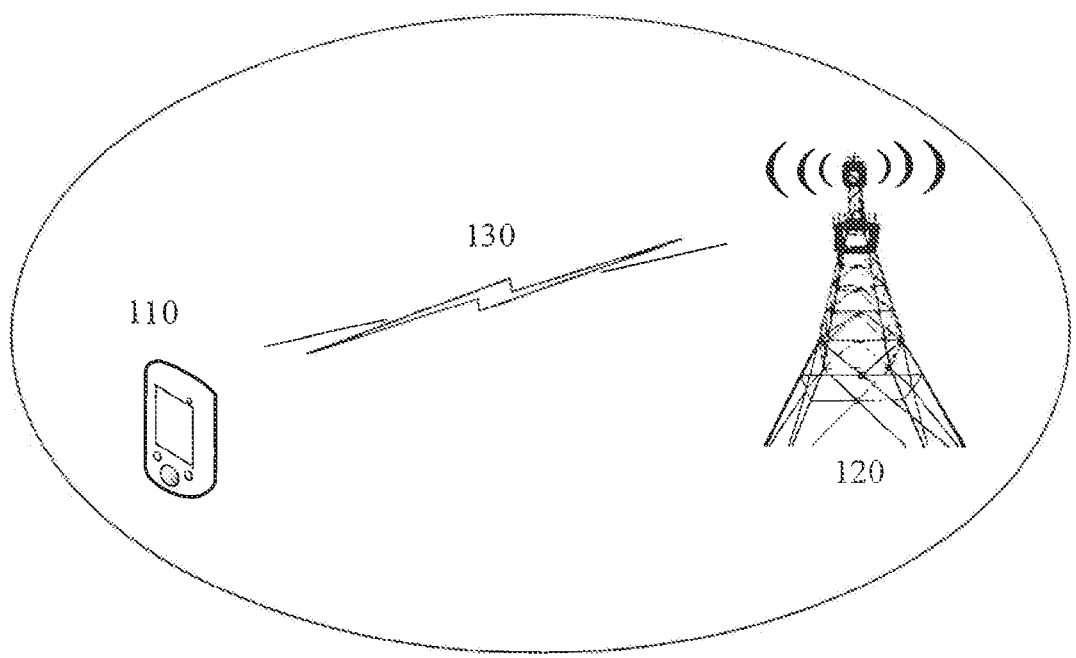
FIG. 1 is an exemplary system architecture diagram of an emergency call method provided by an embodiment of the present application.

FIG. 1 is an exemplary system architecture diagram of an emergency call method provided by an embodiment of the present application.

As shown in FIG. 1, the system architecture may include at least one terminal 110, a network device 120, and a network 130, and the network 130 is a medium for providing communication links among terminals, and between terminals and network devices. The network 130 may include various types of wired communication links or wireless communication links, for example, the wired communication links include an optical fiber, a twisted pair, or a coaxial cable, and the wireless communication links include Bluetooth communication links, wireless fidelity (Wi-Fi) communication links, or microwave communication links.

The terminal 110 may be hardware or software. When the terminal 110 is the hardware, it may be a variety of electronic devices having a display screen, including but not limited to a smart phone, a tablet, a laptop computer, a desktop computer, and so on. When the terminal 110 is the software, it may be installed in an electronic device listed above. It can be implemented into multiple software or software modules (e.g., for providing a distributed service), or it can be implemented into a single software or software module, which is not limited herein.

The network device 120 is an interface device for a mobile device to access the Internet and is also in a form of a radio station, which refers to a radio transceiver station for transmitting information to the mobile terminal through a mobile communication exchange center in a certain radio coverage area.

The terminal 110 may interact with the network device 120 through the network 130 to receive a message from the network device 120, or send a message to the network device 120. The communication technology between the network device and the terminal 110 may include the fifth generation of mobile communication (5th generation wireless systems new radio, 5G NR) standard technology, the long term evolution (LTE) standard technology, the universal mobile telecommunications system (UMTS) standard technology, the global system for mobile communications (GSM) standard technology, or a combination thereof.

The terminal 110 may be installed with a variety of communication client applications, such as drawing applications, video recording applications, video playback applications, voice acquisition applications, voice interaction applications, search applications, timely communication tools, email clients, and social platform software.

Furthermore, the network device 120 corresponds to a public land mobile network (PLMN) or operator identification. For network devices of different PLMNs, the corresponding frequency bands are different for the same standard communication technology. For example, the frequency band range of the PLMN for the LTE technology corresponding to China Mobile includes 1880-1900 MHz (20M), 2320-2370 MHz (50M), and 2575-2635 MHz (65M). The frequency band range of the PLMN for the LTE standard technology corresponding to China Unicom includes 2300-2320 MHz (20M) and 2555-2575 MHz (20M). The frequency band range of the PLMN for the LTE standard technology corresponding to China Telecom includes 2370-2390 MHz (20M) and 2635-2655 MHz (20M).

It should be understood that the number of terminals, networks, and network devices in FIG. 1 is only schematic, and may be any number of terminals, networks, and network devices according to implementation needs.

Figure 2:
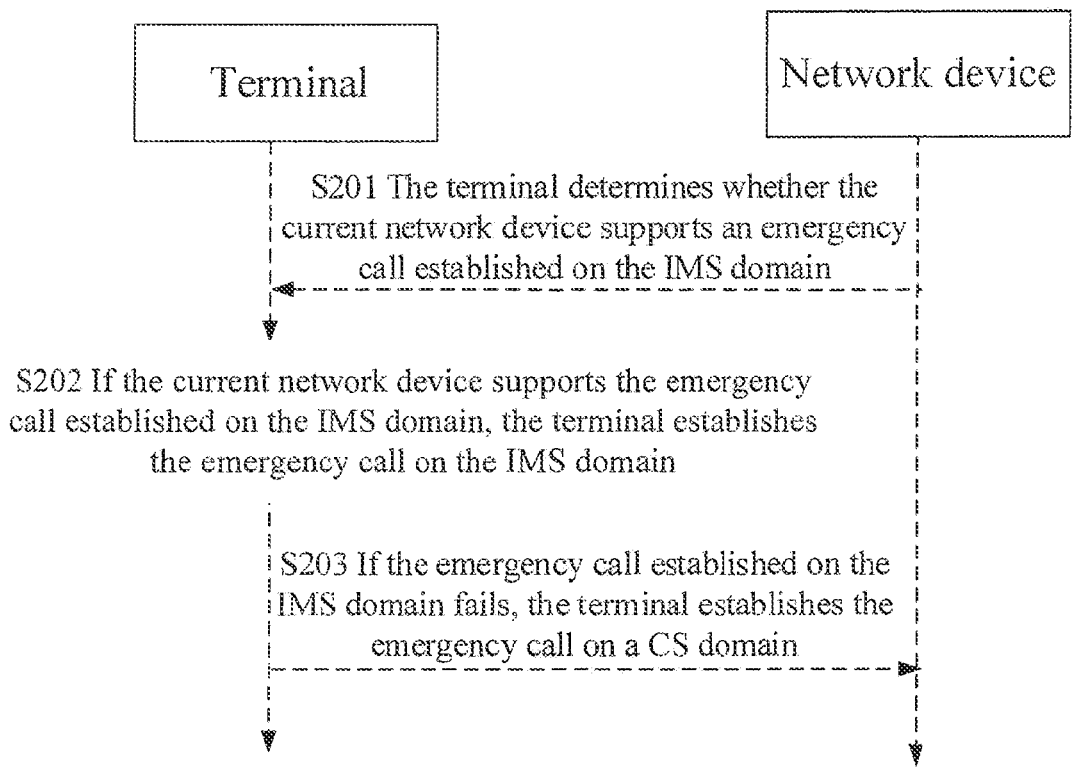
FIG. 2 is a system interaction diagram of an emergency call method provided by an embodiment of the present application.

Referring to FIG. 2, FIG. 2 is a system interaction diagram of an emergency call method provided by an embodiment of the present application, the following will be combined with FIGS. 1 and 2 to describe a system interaction process in the emergency call method.

In S201, the terminal determines whether the current network device supports an emergency call established on the IMS domain.

Alternatively, before it is determined whether the current network device supports the emergency call established on the IMS domain, the method further includes that it is determined whether the terminal is in a limited service state, if the terminal is in the limited service state, the step in which it is determined whether the current network device supports the emergency call established on the IMS domain includes that system information broadcast by the current network device is received; and if the system information carries a first emergency call identifier, it is determined that the current network device supports the emergency call established on the IMS domain.

Alternatively, after it is determined that the current device is in the limited service state, the method further includes that if the current device is not in the limited service state, the step in which it is determined whether the current network device supports the emergency call established on the IMS domain includes that system information broadcast by the current network device is received, and if the system information carries a second emergency call identifier, it is determined that the current network device supports the emergency call established on the IMS domain.

In S202, if the current network device supports the emergency call established on the IMS domain, the emergency call is established on the IMS domain.

In an embodiment, the step in which the emergency call is established on the IS domain includes that an attachment request of an emergency call type is sent to the network device, where the attachment request is configured to instruct the network device to establish an attachment data channel on the IMS domain, and an emergency call service is carried on the attachment data channel.

In an embodiment, the step in which the emergency call is established on the IS domain includes that a public data network request of an emergency call type is sent, where the public data network request is configured to instruct the network device to establish a public data network data channel on the IMS domain, and an emergency call service is carried on the public data network data channel.

The attachment data channel or the public data network data channel is only configured to carry the emergency call service.

In S203, if the emergency call established on the IMS domain fails, the emergency call is established on a CS domain.

In an embodiment, if the system information does not carry the first emergency call identifier or the second emergency call identifier, it is determined that the current network device does not support the emergency call established on the IMS domain, and the emergency call is established on the CS domain.

In the present application, firstly, it is determined whether the current network device supports an emergency call established on an IMS domain; then, if the current network device supports the emergency call established on the IMS domain, the emergency call is established on the IMS domain. Finally, if the emergency call established on the IMS domain fails, the emergency call is established on the CS domain. If the current network device supports the emergency call established on the IS domain, it represents that the current network allows the emergency call to be established on the IMS domain, so the emergency call can be prioritized to be established on the IMS domain, and when the emergency call established on the IMS domain fails, the emergency call may also be established on the CS domain, which improves the success rate of establishing the emergency call by the terminal, so that the safety of a user when the user uses the terminal in the emergency state is guaranteed.

Figure 3:
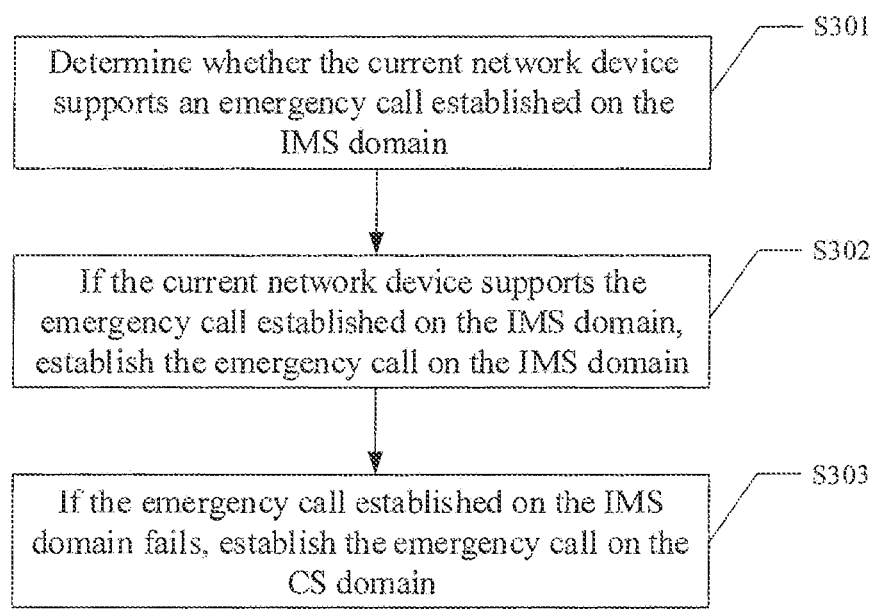
FIG. 3 is a flowchart of an emergency call method provided by another embodiment of the present application.

Referring to FIG. 3, FIG. 3 is a flowchart of an emergency call method provided by another embodiment of the present application.

As shown in FIG. 3, the method includes the following steps.

In S301, it is determined whether the current network device supports an emergency call established on the IMS domain.

In the related technologies, when the terminal may need an emergency call due to the reasons of the environment where the terminal is located or the software and hardware reasons of the terminal, where the emergency call may be considered as a call mode different from normal calls, the call object of the emergency call may be a specified or preset number, and the data channel used in the emergency call may also be a specified channel, in practical applications, the specific mode of the emergency call may be set according to requirements.

In an embodiment of the present application, the network device may be an interface device for the mobile device to access the Internet, or in the form of a radio station, which refers to a radio transceiver station for transmitting information to the mobile terminal through the mobile communication exchange center in a certain radio coverage area, for example, the network device may be a base station, a wireless transceiver, or other network devices. In an embodiment, the communication technology between the network device and the terminal 110 may include the 5G NR standard technology, the LTE standard technology, or a combination thereof, in the 5G NR standard technology or the LTE standard technology, whether the current network device supports the emergency call established on the IMS domain is determined by the network policy in the network device in the area where the terminal is currently located.

The IMS refers to an IP multimedia system and is a new form of multimedia services, and the IMS can meet the requirements of terminal customers for more novel and diversified multimedia services. The IMS is considered as the core technology of next-generation networks and also an important way to solve the convergence of mobile and fixed networks, and introduce differentiated services such as voice, data, and video triple convergence. In the 5G NR standard technology and the LTE standard technology, since the IMS domain has better performance, the IMS domain is prioritized for the use in a call process, so the emergency call method provided in the embodiments of the present application is on the basis that the IMS domain is prioritized for the use in the call process.

On the other hand, if the terminal wants to realize an emergency call based on the IMS domain, except for supporting the IMS domain, the network device also requires to support the emergency call to be established on the IMS domain, so when the user needs an emergency call, the network policy in the network device needs to be obtained first, so as to determine whether the current network device where the terminal is located supports the emergency call established on the IMS domain. The possible way is that before a terminal registers in the network device, the network device broadcasts a message containing system information, so that after the terminal receives the system information broadcast by the network device, it may be extracted whether the system information carries identification information representing that the emergency call may be established. When it is extracted that the system information carries the identification information representing that the emergency call may be established, the current network device supports the emergency call established on the IMS domain. When it cannot be extracted that the system information carries the identification information representing that the emergency call may be established, it represents that the current network device does not support the emergency call established on the IMS domain.

In S302, if the current network device supports the emergency call established on the IMS domain, the emergency call is established on the IMS domain.

In the preceding steps, when it is extracted that the system information carries the identification information representing that the emergency call may be established, it represents that the current network device supports the emergency call established on the IMS domain, that is, the current network device allows the terminal under the network coverage to establish the emergency call on the IMS domain, so when the terminal obtains the information, the hardware and software in the terminal may be called to establish the emergency call on the IMS domain, in which the process of an emergency call may not be limited.

Further, when it cannot be extracted that the system information carries the identification information representing that the emergency call may be established, it represents that the current network device does not support the IMS domain established the emergency call, then the emergency call may be established directly on the circuit switched (CS) domain. The voice transmission manner on the CS domain is different from the voice transmission manner through IP packets on the above IMS domain, when a call is made through the CS domain, the CS domain will allocate a fixed channel for both sides of the call. Throughout the call, this "specified" channel may be occupied, and no one else can occupy this channel. At the end of the call, the CS domain releases this channel for allocating the channel to another user of the next call. In simple terms, the circuit is connected when the call is established and the circuit is disconnected when the call ends, which is the communication characteristic of the CS domain.

In S303, if the emergency call established on the IMS domain fails, the emergency call is established on the CS domain.

It is understood that due to the environment where the terminal is located and the configuration of the terminal, the terminal may fail to establish an emergency call when establishing the emergency call on the IMS domain, for example, due to insufficient network resources or insufficient bandwidth of the network device on the IS domain, or due to an error in the program of the terminal which is used for executing the establishment of an emergency call on the IMS domain, it may cause a failure of establishing an emergency call on the IMS domain by the terminal, at this time, the emergency call may be established directly on the CS domain, the hardware resources and software resources required are called to establish the emergency call on the CS domain, and the emergency call is established on the CS domain.

In the present application, firstly, it is determined whether the current network device supports an emergency call established on an IMS domain; then, if the current network device supports the emergency call established on the IMS domain, the emergency call is established on the IMS domain. Finally, if the emergency call established on the IMS domain fails, the emergency call is established on the CS domain. If the current network device supports the emergency call established on the IS domain, it represents that the current network allows the emergency call established on the IMS domain, so the emergency call can be prioritized to be established on the IMS domain, and when the emergency call established on the IMS domain fails, the emergency call may also be established on the CS domain, which improves the success rate of establishing the emergency call by the terminal, so that the safety when the user uses the terminal in the emergency state is guaranteed.

Figure 4:
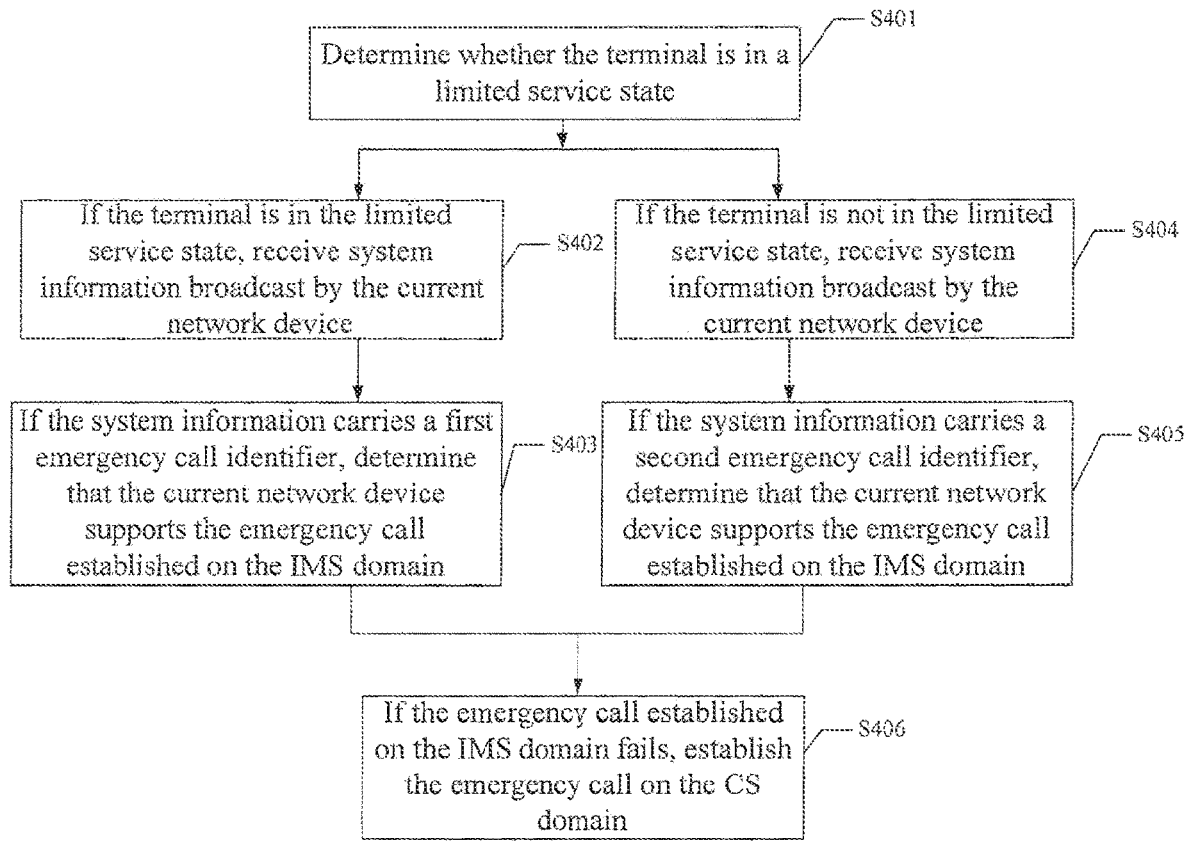
FIG. 4 is a flowchart of an emergency call method provided by another embodiment of the present application.

Referring to FIG. 4, FIG. 4 is a flowchart of an emergency call method provided by another embodiment of the present application.

As shown in FIG. 4, the method includes the following steps.

In S401, it is determined whether the terminal is in a limited service state.

It should be understood that the specific process of a user making an emergency call is also related to the communication state of the terminal, the communication state of the terminal may include a limited service state and an unlimited service state (normal service state), the reason why the terminal is in the limited service state may be diverse, for example, when the user subscriber identification module (SIM) card in the terminal has a problem, as a result, the communication module in the terminal cannot register normally in the network device through the SIM card, leading the terminal to be in the limited service state. The manner of determining whether the terminal is in the limited service state, the communication module in the terminal may detect whether registration or handshake may be performed in the current network device, and when the communication module in the terminal detects that the registration or handshake may be performed in the current network device, it represents that the terminal is not in the limited service state; and when the communication module in the terminal detects that the registration or handshake cannot be performed in the current network device, it represents that the terminal is in the limited service state, and at this time, it cannot be called through a normal call process or a call network, and a call needs to be performed in the emergency call manner.

In S402, if the terminal is in the limited service state, system information broadcast by the current network device is received.

If the terminal is in the limited service state and the call needs to be performed in the emergency call manner, it needs to first determine whether the current network device supports the emergency call established on the IMS domain. In a specific manner, the system information (SIB1) broadcast by the current network device may be received first.

In S403, if the system information carries a first emergency call identifier, it is determined that the current network device supports the emergency call established on the IMS domain.

After the system information broadcast by the current network device is received, all information in the system information may be extracted, and it is queried whether the first emergency call identifier exists in all the information, where the first emergency call identifier is an identifier agreed upon in advance between the terminal and the network device, when the network is designed to support the terminal in the limited service state to establish the emergency call on the IMS domain, the first emergency call identifier will be carried in the broadcast system information, and the first emergency call identifier may be set according to an actual situation, for example, the first emergency call identifier may be ims-emergency-support field. When the terminal extracts the system information carrying the first emergency call identifier, it is determined that the current network device supports the terminal in the limited service state to establish the emergency call on the IMS domain.

In an embodiment, establishing the emergency call on the IMS domain may include sending an attachment request of an emergency call type to the network device, the attachment request is used to instruct the network device to establish an attachment data channel on the IMS domain, and an emergency call service is carried on the attachment data channel. The attachment request of the emergency call type may have multiple manifestations, for example, it may be an attachment request with the type of emergency. When receiving the attachment request of the emergency call type, the network device may establish the attachment data channel corresponding to the attachment request of the emergency call type in the terminal, and the network device returns feedback information to the terminal after the attachment data channel is established, so that the terminal may carry the emergency call service on the attachment data channel and execute an emergency call procedure.

In S404, if the terminal is not in the limited service state, system information broadcast by the current network device is received.

When the terminal is not in the limited service state, that is, the terminal is in the normal service state, at this time, if a user needs to call in the emergency call manner, it still needs to first determine whether the current network device supports the emergency call established on the IMS domain, the specific way is that the current network device may first receive the system information (SIB2) broadcast by the current network device, and this system information may be different from the system information in step S402, so that the terminal distinguishes different terminal states and selects different request types to establish the emergency call.

In S405, if the system information carries a second emergency call identifier, it is determined that the current network device supports the emergency call established on the IMS domain.

After the system information broadcast by the current network device is received, all information in the system information may be extracted, and it is queried whether the second emergency call identifier exists in all the information, where the second emergency call identifier is an identifier agreed upon in advance between the terminal and the network device. When the network device supports a terminal that is not in the limited service state (normal service state) to establish the emergency call on the IMS domain, the second emergency call identifier may be carried in the broadcast system information. The second emergency call identifier may be set according to actual situations, for example, the second emergency call identifier may be EMC_BS-1. When the terminal extracts the second emergency call identifier in the system information, it is determined that the current network device supports the terminal that is not in the limited service state (normal service state) to establish the emergency call on the IMS domain.

In an embodiment, establishing the emergency call on the IMS domain includes the following:

sending a public data network request of an emergency call type to the network device, the public data network request is used to instruct the network device to establish a public data network data channel on the IMS domain, and an emergency call service is carried on the public data network data channel. A public data network (PDN) is a communication network providing data communication services to the public. The PDN is composed of switches, network control centers, user network access devices, communication lines, and other facilities. Each user connected to the network may communicate with other users in the network, and the public data network is responsible for transparent and error-free data transmission among the switches, network control centers, user network access devices, communication lines, and other facilities. There are public digital data networks, public packet switching data networks, public frame relay networks, public ATM (asynchronous transmission mode) networks, etc. In addition to a platform service for general data exchange to the public, it also provides a public electronic mailbox service, a public broadband multimedia service, a public electronic data interchange service, a public Internet service, a public wireless data communication network, and the corresponding services.

The public data network request of the emergency call type may also have a variety of manifestations, for example, a public data network request of the type of emergency. When the network device receives the public data network request of the emergency call type, a public data network data channel corresponding to the public data network request of the emergency call type may be established in the terminal, and the feedback information that the establishment of the public data network data channel completes is returned to the public data network data channel of the terminal, so that the terminal may carry the emergency call service on the public data network data channel and execute the emergency call process.

In the above embodiments, if the system information does not carry the first emergency call identifier or the second emergency call identifier, it is determined that the current network device does not support the emergency call established on the IMS domain, and the emergency call is established on the CS domain. The attachment data channel or the public data network data channel is only used to carry the emergency call service, so as to improve the execution efficiency of the emergency call service and improve the security guarantee of users.

In the present application, firstly, it is determined whether the current network device supports an emergency call established on an IMS domain; then, if the current network device supports the emergency call established on the IMS domain, the emergency call is established on the IMS domain. Finally, if the emergency call established on the IMS domain fails, the emergency call is established on the CS domain. If the current network device supports the emergency call established on the IS domain, it represents that the current network allows the emergency call to be established on the IMS domain, so the emergency call can be prioritized to be established on the IMS domain, and when the emergency call fails to be established on the IMS domain, the emergency call may also be established on the CS domain, which improves the success rate of establishing the emergency call by the terminal, so that the safety when a user uses the terminal in the emergency state is guaranteed.

In S406, if the emergency call established on the IMS domain fails, the emergency call is established on the CS domain.

It is understood that due to the environment where the terminal is located and the configuration of the terminal, the terminal may fail to establish an emergency call when establishing the emergency call on the IMS domain, for example, due to insufficient network resources or insufficient bandwidth of the network device on the IS domain, or due to an error in the program of the terminal which is used for executing the establishment of an emergency call on the IMS domain, it may cause a failure of establishing the emergency call on the IMS domain by the terminal, at this time, the emergency call may be established directly on the CS domain, the hardware resources and software resources required are called to establish the emergency call on the CS domain, and the emergency call is established on the CS domain.

Figure 5:
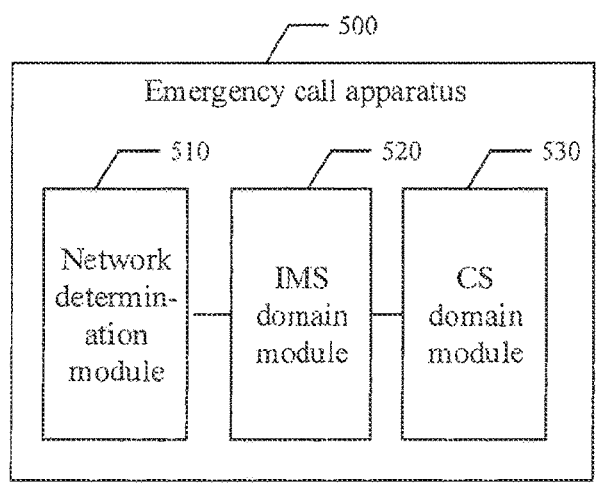
FIG. 5 is a schematic diagram of an emergency call apparatus provided by another embodiment of the present application.

Referring to FIG. 5, FIG. 5 is a schematic diagram of an emergency call apparatus provided by another embodiment of the present application.

As shown in FIG. 5, the emergency call apparatus 500 includes a network determination module 510, an IMS domain module 520, and a CS domain module 530.

The network determination module 510 is configured to determine whether the current network device supports an emergency call established on an IMS domain.

The IMS domain module 520 is configured to establish the emergency call on the IMS domain, if the current network device supports the emergency call established on the IMS domain.

The CS domain module 530 is configured to establish the emergency call on a CS domain, if the emergency call established on the IMS domain fails.

Figure 6:
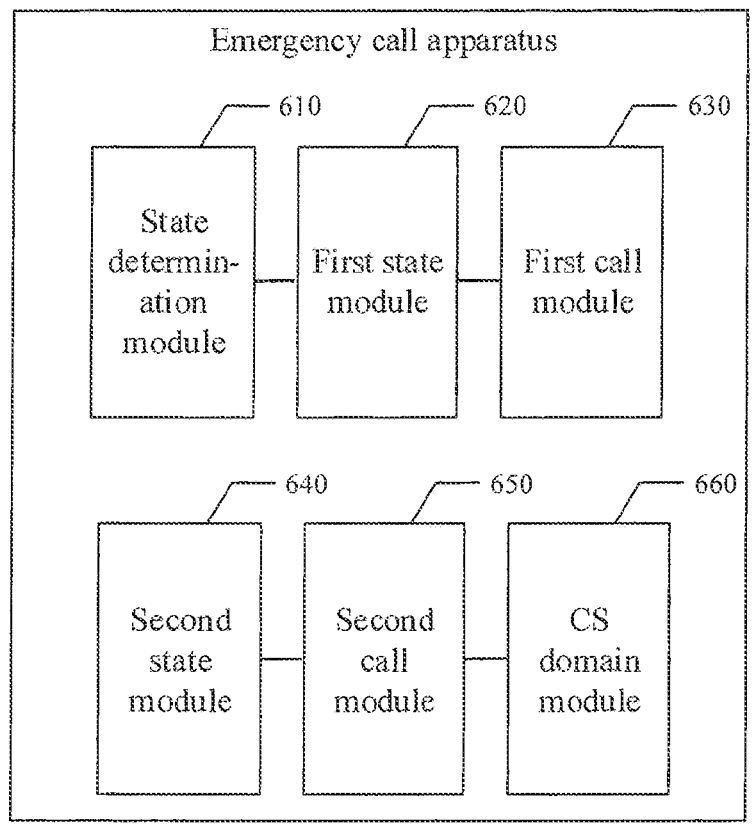
FIG. 6 is a schematic diagram of an emergency call apparatus provided by another embodiment of the present application.

Referring to FIG. 6, FIG. 6 is a schematic diagram of an emergency call apparatus provided by another embodiment of the present application.

As shown in FIG. 6, the emergency call apparatus 600 includes a state determination module 610, a first state module 620, a first calling module 630, a second state module 640, and a second calling module 650.

The state determination module 610 is configured to determine whether the terminal is in a limited service state.

The first state module 620 is configured to receive system information broadcast by the current network device, if the terminal is in the limited service state.

The first calling module 630 is configured to determine that the current network device supports the emergency call established on the IMS domain, if the system information carries a first emergency call identifier.

Establishing the emergency call on the IMS domain includes that an attachment request of an emergency call type is sent to the network device, where the attachment request is configured to instruct the network device to establish an attachment data channel on the IMS domain, and an emergency call service is carried on the attachment data channel.

The second state module 640 is configured to receive system information broadcast by the current network device, if the terminal is not in the limited service state.

The second calling module 650 is configured to determine that the current network device supports the emergency call established on the IMS domain, if the system information carries a second emergency call identifier.

Establishing the emergency call on the IMS domain includes that a public data network request of an emergency call type is sent, where the public data network request is configured to instruct the network device to establish a public data network data channel on the IMS domain, and an emergency call service is carried on the public data network data channel.

If the system information does not carry the first emergency call identifier or the second emergency call identifier, it is determined that the current network device does not support the emergency call established on the IMS domain, and the emergency call is established on the CS domain. The attachment data channel or the public data network data channel is only configured to carry the emergency call service.

The CS domain module 660 is configured to establish the emergency call on a CS domain, if the emergency call established on the IMS domain fails.

In an embodiment of the present application, the emergency call apparatus includes a network determination module, an IMS domain module, and a CS domain module. The network determination module is configured to determine whether the current network supports the emergency call established on the IMS domain, the IMS domain module is configured to establish the emergency call on the IMS domain, if the current network device supports the emergency call established on the IMS domain.

The CS domain module is configured to establish the emergency call on a CS domain, if the emergency call established on the IMS domain fails. If the current network device supports the emergency call established on the IMS domain, it represents that the current network allows the emergency call to be established on the IMS domain, so the emergency call can be prioritized to be established on the IMS domain, and when the emergency call established on the IMS domain fails, the emergency call may also be established on the CS domain, which improves the success rate of establishing the emergency call by the terminal, so that the safety when a user uses the terminal in the emergency state is guaranteed.

Embodiments of the present application also provide a computer storage medium, the computer storage medium may store a plurality of instructions, and the instructions are suitable for being loaded by the processor to implement the method steps described above.

Embodiments of the present application also provide a network device, the network device may store a memory, a processor and computer programs stored on the memory and executable on the processor, and the processor executes the method steps described above.

Figure 7:
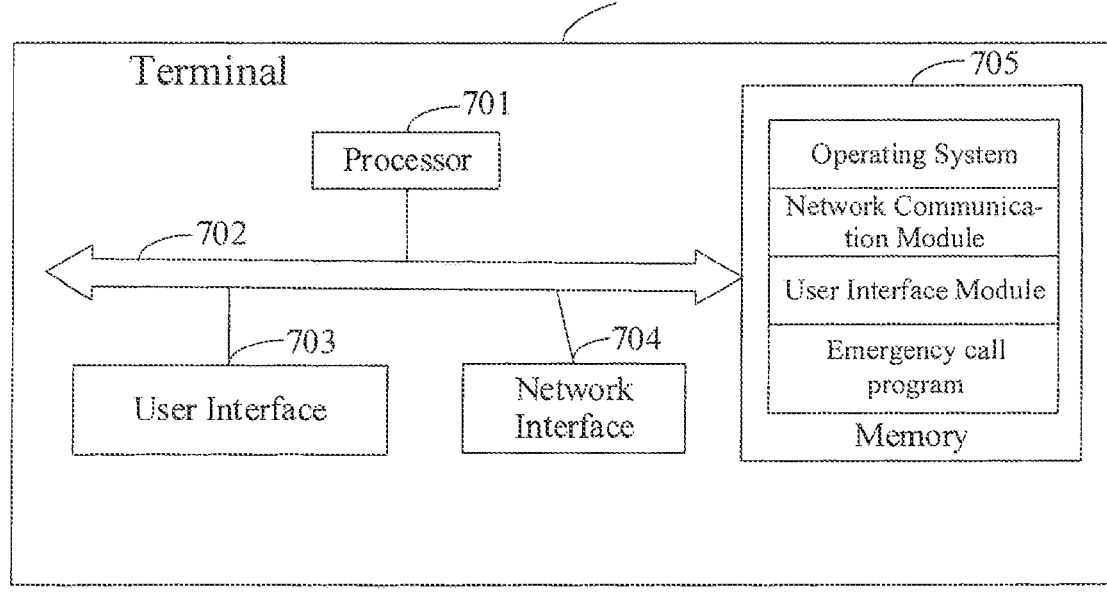
FIG. 7 is a schematic diagram of a terminal provided by an embodiment of the present application.

Referring to FIG. 7, FIG. 7 is a schematic diagram of a terminal provided by an embodiment of the present application. As shown in FIG. 7, the terminal 700 may include at least one processor 701, at least one network interface 704, a user interface 703, a memory 705, and at least one communication bus 702.

The communication bus 702 is used to realize connection communications among these components.

The user interface 703 may include a display and a camera, and the user interface 703 may also include a standard wired interface and a wireless interface.

The network interface 704 may include a standard wired interface and a wireless interface (such as a wireless fidelity (Wi-Fi) interface).

The processor 701 may include one or more processing cores. The processor 701 uses various interfaces and lines to connect the components of the entire terminal 700, and the processor 701 performs various functions and processes data by performing or executing instructions, programs, code sets or instruction sets stored in the memory 705 and by calling data stored in the memory 705. Alternatively, the processor 701 may be implemented in at least one hardware form of a digital signal processing (DSP), a field-programmable gate array (FPGA), or a programmable logic array (PLA). The processor 701 may integrate one or more combinations of a central processing unit (CPU), a graphics processing unit (GPU), a modem, and so on. Among them, the CPU mainly handles the operating system and the user interfaces and applications, the GPU is responsible for rendering and drawing the content required to be displayed by the display, and the modem is used to handle wireless communications. It can be understood that the above modem may also be implemented without being integrated into the processor 701 and implemented by a single chip.

The memory 705 may include a random access memory (RAM), and may also include a read-only memory. In an embodiment, the memory 705 includes a non-transitory computer-readable storage medium. The memory 705 may be used to store instructions, programs, codes, code sets, or instruction sets. The memory 705 may include a stored program area and a storage data area, where the stored program area may store instructions for implementing the operating system, instructions for at least one function (such as the touch function, the sound playback function, the image playback function, etc.), instructions for implementing each embodiment of the above methods, and the like. The storage data area may store data involved in each embodiment of the above methods. The memory 705 may also be at least one storage device located far away from the processor 701. As shown in FIG. 7, as a computer storage medium, the memory 705 may include the operating system, a network communication module, a user interface module, and a cell switching application.

In the terminal 700 shown in FIG. 7, the user interface 703 is mainly configured to provide an input interface for a user to obtain user input data. The processor 701 may be used to call the cell switching application program stored in the memory 705, and the processor 701 is configured to execute the following:

It is determined whether the current network device supports an emergency call established on an IMS domain;

if the current network device supports the emergency call established on the IMS domain, the emergency call is established on the IMS domain; and if the emergency call established on the IS domain fails, the emergency call is established on a CS domain.

In an embodiment, before executing the step in which it is determined whether the current network device supports the emergency call established on the IMS domain, the processor 701 is further configured to execute the following steps, it is determined whether the terminal is in a limited service state, if the terminal is in the limited service state, when the processor 701 executes the step in which it is determined whether the current network device supports the emergency call established on the IMS domain, the processor 701 executes that system information broadcast by the current network device is received, and if the system information carries a first emergency call identifier, it is determined that the current network device supports the emergency call established on the IMS domain.

In an embodiment, when the processor 701 executes the step in which the emergency call is established on the IMS domain in the following manner: sending an attachment request of an emergency call type to the network device, where the attachment request is configured to instruct the network device to establish an attachment data channel on the IMS domain, and carrying an emergency call service on the attachment data channel.

In an embodiment, after executing the step in which it is determined that the current device is in the limited service state, the processor 701 may further execute the following steps, if the current device is not in the limited service state, when executing the step in which it is determined whether the current network device supports the emergency call established on the IMS domain, the processor 701 may further execute that system information broadcast by the current network device is received, and if the system information carries a second emergency call identifier, it is determined that the current network device supports the emergency call established on the IMS domain.

In an embodiment, when the processor 701 executes the step in which the emergency call is established on the IMS domain, the processor 701 further executes the following steps: a public data network request of an emergency call type is sent, where the public data network request is configured to instruct the network device to establish a public data network data channel on the IS domain, and an emergency call service is carried on the public data network data channel.

In an embodiment, if the system information does not carry the first emergency call identifier or the second emergency call identifier, it is determined that the current network device does not support the emergency call established on the IMS domain, and the emergency call is established on the CS domain. The attachment data channel or the public data network data channel is only configured to carry the emergency call service.

In several embodiments provided in the present application, it should be understood that the disclosed apparatus and methods may be implemented by other means. For example, the device embodiments described above are only schematic, for example, the division of modules, only for a logical function division, the actual implementation may have another division, such as a plurality of modules or components may be combined or integrated into another system, or some features may be ignored, or not performed. On another point, the coupling or direct coupling or communication connection between each other shown or discussed may be indirect coupling or communication connection through some interface, device, or module, which may be electrical, mechanical, or other.

The modules described as separate parts may or may not be physically separated, and the parts displayed as modules may or may not be physical modules, i.e., may be located in one place, or may also be distributed on multiple network modules. Some or all of the modules may be selected according to actual needs to achieve the purpose of the present embodiment.

Further, each functional module in each embodiment of the present application may be integrated in a processing module, or each module may exist physically separately, or two or more modules may be integrated in one module. The above integrated modules can be implemented in the form of hardware or software function modules.

The integrated module can be stored in a computer-readable storage medium if implemented as a software function module and sold or used as a stand-alone product. Based on this understanding, the technical scheme of the present application essentially or contributed to the prior art or all or part of the technical solution may be embodied in the form of a software product, the computer software product stored in a storage medium, including a number of instructions to enable a computer device (may be a personal computer, server, or network device, etc.) to perform all or part of the steps of each embodiment method of the present application. The aforementioned storage media include a U disk, a portable hard disk, a read-only memory (ROM), a random access memory (RAM), a disk or an optical disk, and other media that may store program codes.

It should be noted that for the embodiments of the foregoing methods, for the sake of simplicity, they are expressed as a series of combinations of actions, but those skilled in the art should be aware that the present application is not limited by the sequence of actions described, because according to the present application, certain steps may be performed in other sequences or simultaneously. Secondly, those skilled in the art should also be aware that the embodiments described in the description are preferred embodiments, and the actions and modules involved are not necessarily necessary for the present application.

In the above embodiments, the description of each embodiment has its own emphasis, and the part not described in detail in one embodiment may refer to the relevant description of other embodiments.

The above is the description of the emergency call method and apparatus, a storage medium, and a terminal provided by the present application, for those skilled in the art, according to the idea of the embodiments of the present application, there will be changes in the embodiments and the scope of application, in summary, the content of the present specification should not be understood as the limitation on the present application.

What is claimed is:

1. An emergency call method, applied to a terminal, comprising:
   determining whether a current network device supports an emergency call established on an Internet protocol multimedia subsystem (IMS) domain;
   in a case where the current network device supports the emergency call established on the IMS domain, establishing the emergency call on the IMS domain; and
   in a case where the emergency call established on the IMS domain fails, establishing the emergency call on a circuit switched (CS) domain;
   wherein before determining whether the current network device supports the emergency call established on the IMS domain, the method further comprises:
   determining whether the terminal is in a limited service state;
   wherein in a case where the terminal is in the limited service state, determining whether the current network device supports the emergency call established on the IMS domain comprises:
   receiving system information broadcast by the current network device; and
   in a case where the system information carries a first emergency call identifier, determining that the current network supports the emergency call established on the IMS domain.

2. The method according to claim 1, wherein establishing the emergency call on the IMS domain comprises:
   sending an attachment request of an emergency call type to the network device, wherein the attachment request is configured to instruct the network device to establish an attachment data channel on the IMS domain; and carrying an emergency call service on the attachment data channel.

3. The method according to claim 1, wherein after determining whether the terminal is in the limited service state, the method further comprises:
   in a case where the terminal is not in the limited service state, determining whether the current network device supports the emergency call established on the IMS domain comprises:
   receiving system information broadcast by the current network device; and
   in a case where the system information carries a second emergency call identifier, determining that the current network supports the emergency call established on the IMS domain.

4. The method according to claim 3, wherein establishing the emergency call on the IMS domain comprises:
   sending a public data network request of an emergency call type, wherein the public data network request is configured to instruct the network device to establish a public data network data channel on the IMS domain; and carrying an emergency call service on the public data network data channel.

5. The method according to claim 3, comprising: in a case where the system information does not carry the first emergency call identifier or the second emergency call identifier, determining that the current network device does not support the emergency call established on the IMS domain, and establishing the emergency call on the CS domain.

6. The method according to claim 4, wherein the attachment data channel or the public data network data channel is only used to carry the emergency call service.

7. An emergency call apparatus, applied to a terminal, comprising:
   a network determination model, which is configured to determine whether a current network device supports an emergency call established on an Internet protocol multimedia subsystem (IMS) domain;
   an IMS domain module, which is configured to, in a case where the current network device supports the emergency call established on the IMS domain, establish the emergency call on the IMS domain;
   a circuit switched (CS) module, which is configured to, in a case where the emergency call established on the IMS domain fails, establish the emergency call on a CS domain;
   a state determination module, which is configured to determine whether the terminal is in a limited service state;
   a first state module, which is configured to receive system information broadcast by the current network device, if the terminal is in the limited service state; and
   a first calling module, which is configured to determine that the current network device supports the emergency call established on the IMS domain, if the system information carries a first emergency call identifier.

8. A non-transitory computer storage medium, storing a plurality of instructions, wherein the instructions are suitable for being loaded by a processor to implement the method according to claim 1;
   wherein before determining whether the current network device supports the emergency call established on the IMS domain, the processor loads the instructions to further implement the following:
   determining whether the terminal is in a limited service state;
   wherein in a case where the terminal is in the limited service state, the processor loads the instructions to implement determining whether the current network device supports the emergency call established on the IMS domain by:
   receiving system information broadcast by the current network device; and
   in a case where the system information carries a first emergency call identifier, determining that the current network supports the emergency call established on the IMS domain.

9. A terminal, comprising: a memory, a processor, and computer programs stored on the memory and executable by the processor, wherein the processor, when executing the computer programs, implements the following:

determining whether a current network device supports an emergency call established on an Internet protocol multimedia subsystem (IMS) domain;

in a case where the current network device supports the emergency call established on the IMS domain, establishing the emergency call on the IMS domain; and in a case where the emergency call established on the IMS domain fails, establishing the emergency call on a circuit switched (CS) domain;

wherein before determining whether the current network device supports the emergency call established on the IMS domain, the processor further implements the following:

determining whether the terminal is in a limited service state;

wherein in a case where the terminal is in the limited service state, the processor implements determining whether the current network device supports the emergency call established on the IMS domain by:

receiving system information broadcast by the current network device; and in a case where the system information carries a first emergency call identifier, determining that the current network supports the emergency call established on the IMS domain.

10. The terminal according to claim 9, wherein the processor implements establishing the emergency call on the IMS domain by:

sending an attachment request of an emergency call type to the network device, wherein the attachment request is configured to instruct the network device to establish an attachment data channel on the IMS domain; and carrying an emergency call service on the attachment data channel.

11. The terminal according to claim 9, wherein after determining whether the terminal is in the limited service state, the processor further implements the following:

in a case where the terminal is not in the limited service state, the processor implements determining whether the current network device supports the emergency call established on the IMS domain by:

receiving system information broadcast by the current network device; and in a case where the system information carries a second emergency call identifier, determining that the current network supports the emergency call established on the IMS domain.

12. The terminal according to claim 11, wherein the processor implements establishing the emergency call on the IMS domain by:

sending a public data network request of an emergency call type, wherein the public data network request is configured to instruct the network device to establish a public data network data channel on the IMS domain; and carrying an emergency call service on the public data network data channel.

13. The terminal according to claim 11, wherein the processor implements the following: in a case where the system information does not carry the first emergency call identifier or the second emergency call identifier, determining that the current network device does not support the emergency call established on the IMS domain, and establishing the emergency call on the CS domain.

14. The terminal according to claim 12, wherein the attachment data channel or the public data network data channel is only used to carry the emergency call service.

15. The storage medium according to claim 8, wherein the processor loads the instructions to implement implements establishing the emergency call on the IMS domain by:

sending an attachment request of an emergency call type to the network device, wherein the attachment request is configured to instruct the network device to establish an attachment data channel on the IMS domain; and carrying an emergency call service on the attachment data channel.

16. The storage medium according to claim 8, wherein after determining whether the terminal is in the limited service state, the processor loads the instructions to further implement the following:

in a case where the terminal is not in the limited service state, the processor loads the instructions to implement determining whether the current network device supports the emergency call established on the IMS domain by:

receiving system information broadcast by the current network device; and in a case where the system information carries a second emergency call identifier, determining that the current network supports the emergency call established on the IMS domain.

17. The storage medium according to claim 16, wherein the processor loads the instructions to implement establishing the emergency call on the IMS domain by:

sending a public data network request of an emergency call type, wherein the public data network request is configured to instruct the network device to establish a public data network data channel on the IMS domain; and carrying an emergency call service on the public data network data channel.

* * * * *